United States Patent
Park

(10) Patent No.: US 7,086,045 B2
(45) Date of Patent: Aug. 1, 2006

(54) HEURISTIC TO IMPROVE REGISTER ALLOCATION USING PASS DEGREE

(75) Inventor: Seongbae Park, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 709 days.

(21) Appl. No.: 10/037,901

(22) Filed: Oct. 19, 2001

(65) Prior Publication Data

US 2003/0079212 A1    Apr. 24, 2003

(51) Int. Cl.
*G06F 9/45*    (2006.01)
(52) U.S. Cl. .................................... 717/151
(58) Field of Classification Search .............. 717/156, 717/151
See application file for complete search history.

(56) References Cited

U.S. PATENT DOCUMENTS

| | | | |
|---|---|---|---|
| 4,571,678 A | | 2/1986 | Chaitin ..................... 364/300 |
| 5,530,866 A | * | 6/1996 | Koblenz et al. ............. 717/144 |
| 5,761,514 A | * | 6/1998 | Aizikowitz et al. ......... 717/158 |
| 5,784,066 A | * | 7/1998 | Aizikowitz et al. ......... 345/440 |
| 5,901,317 A | * | 5/1999 | Goebel ...................... 717/156 |
| 6,009,272 A | | 12/1999 | Goebel ...................... 395/709 |

OTHER PUBLICATIONS

Fryer et al., Microsoft Press Computer Dictionary, 1997, Microsoft Press, 3$^{rd}$ Ed., 169, 220, 282, 331, 477, 492.*
PLDI, Andrew W. Appell and Lal George, "Optimal Spilling for CISC Machines with Few Registers", pp. 243-253, 2001, Snowbird, UT.
SIGPLAN '99 (PLDI) , Steven R. Vegdahl, "Using Node Merging to Enhance Graph Coloring", pp. 150-154, May 1999, Atlanta, GA.
Association for Computing Machinery (ACM) , Preston Briggs, et al., "Coloring Heuristics for Register Allocation", pp. 275-284, 1989.
Pergamon Press, LTD., Gregory Chaitin, et al.; "Register Allocation via Coloring", pp. 47-57, Computer Languages, vol. 6, No. 1, 1981, Great Britain.
Morgan Kaufmann Publishers, Steven S. Muchnick, "Advanced Compiler Design & Implementation", Chapter 16, pp. 481-530, 1997, San Francisco, CA.

* cited by examiner

*Primary Examiner*—John Chavis
(74) *Attorney, Agent, or Firm*—Gunnison, McKay & Hodgson, L.L.P.; Serge J. Hodgson

(57) ABSTRACT

A method includes adding direction to interference edges of a register interference graph and choosing a node of the register interference graph to spill based upon a pass degree of the node. By using the pass degree, the node that caused the greatest interference with allocation of the variables to the physical registers is preferentially chosen to be spilled.

25 Claims, 5 Drawing Sheets

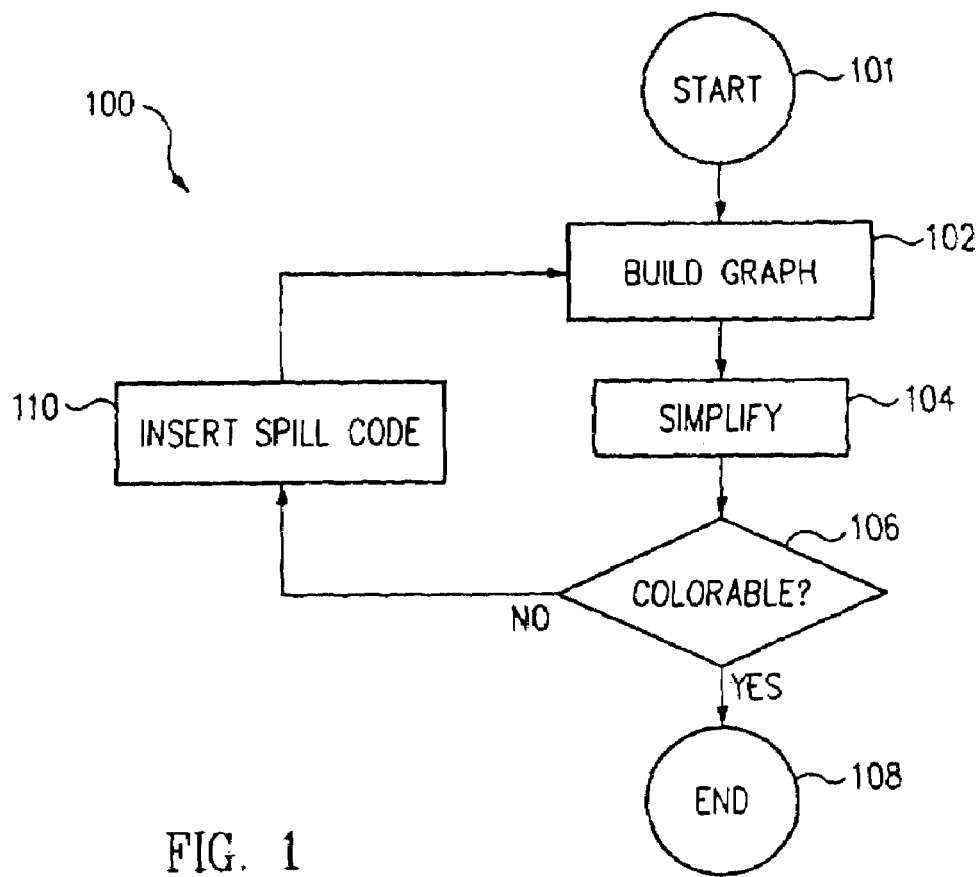
FIG. 1
(PRIOR ART)
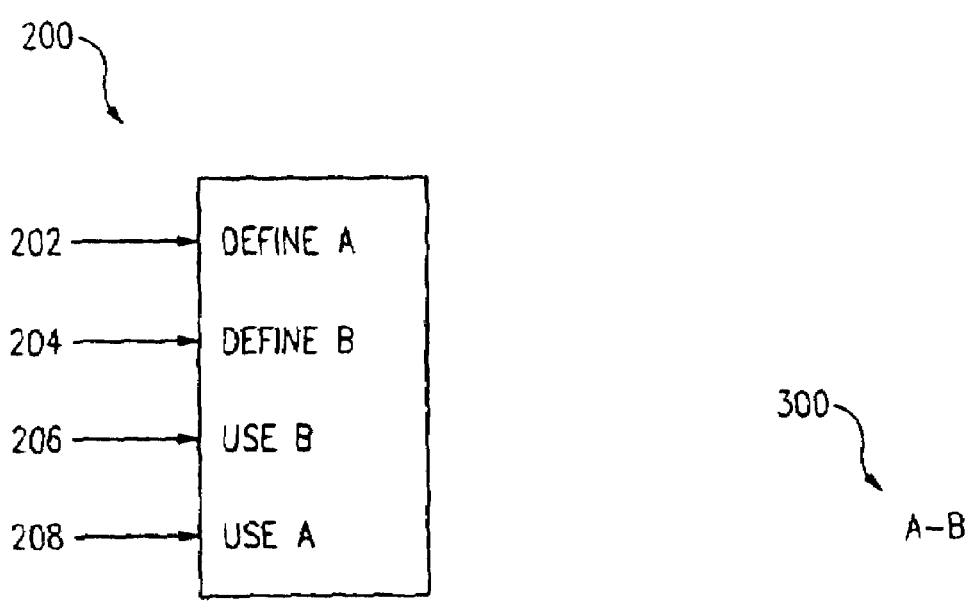
FIG. 2A
FIG. 3
(PRIOR ART)

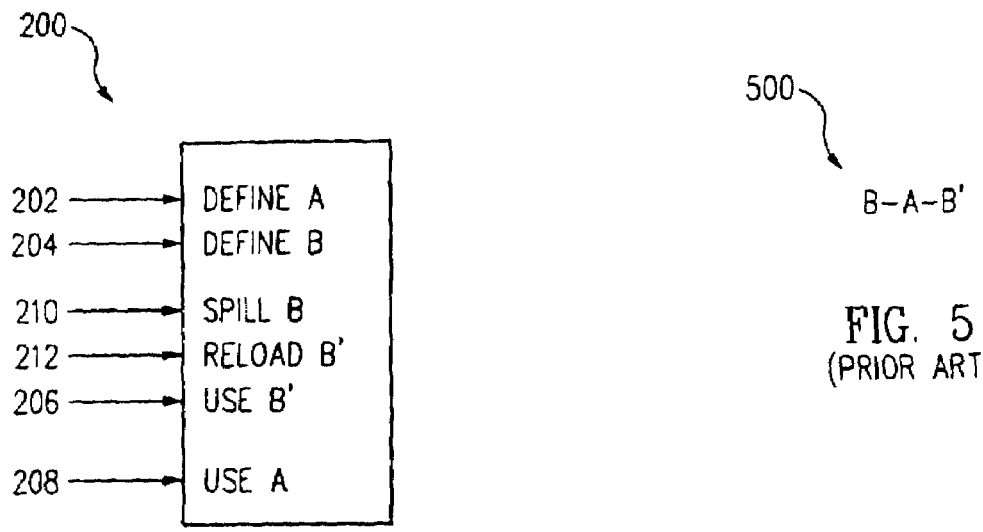
FIG. 2B
(PRIOR ART)
B-A-B'
FIG. 5
(PRIOR ART)
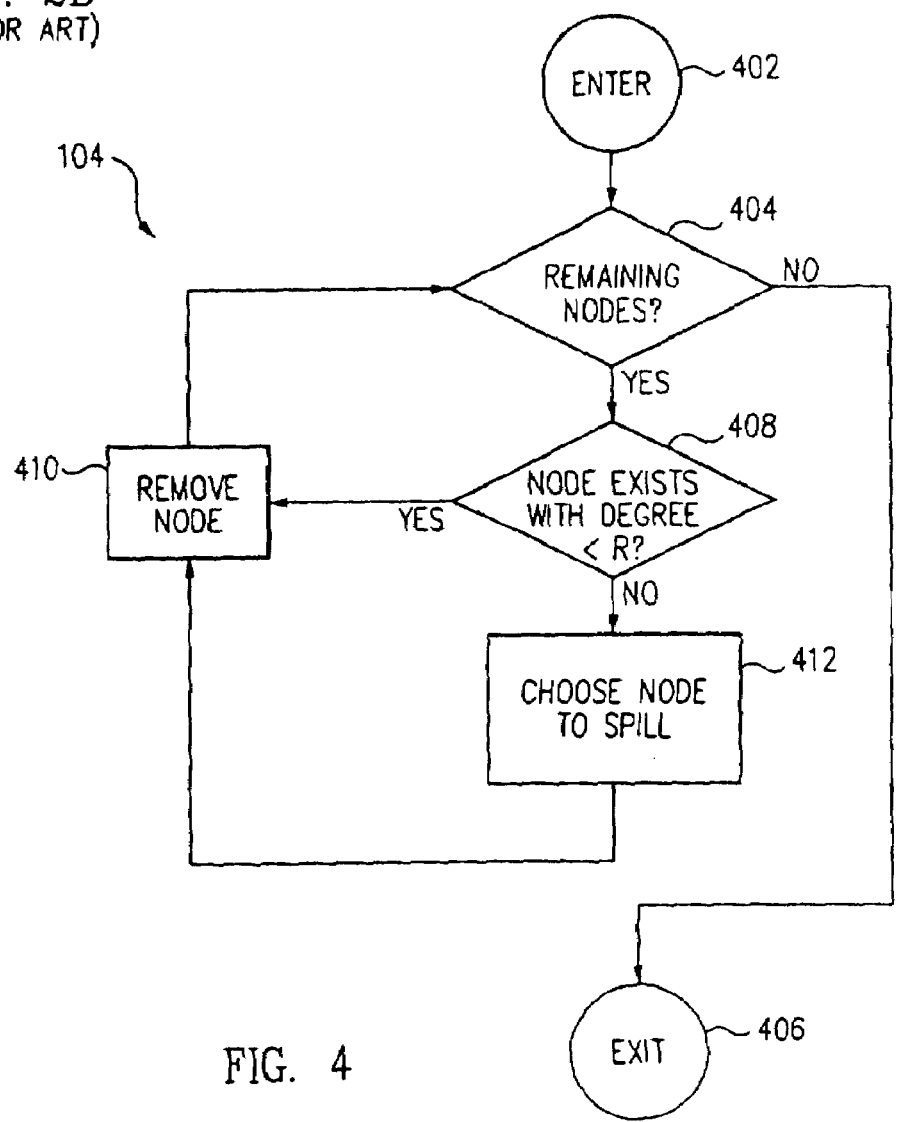
FIG. 4

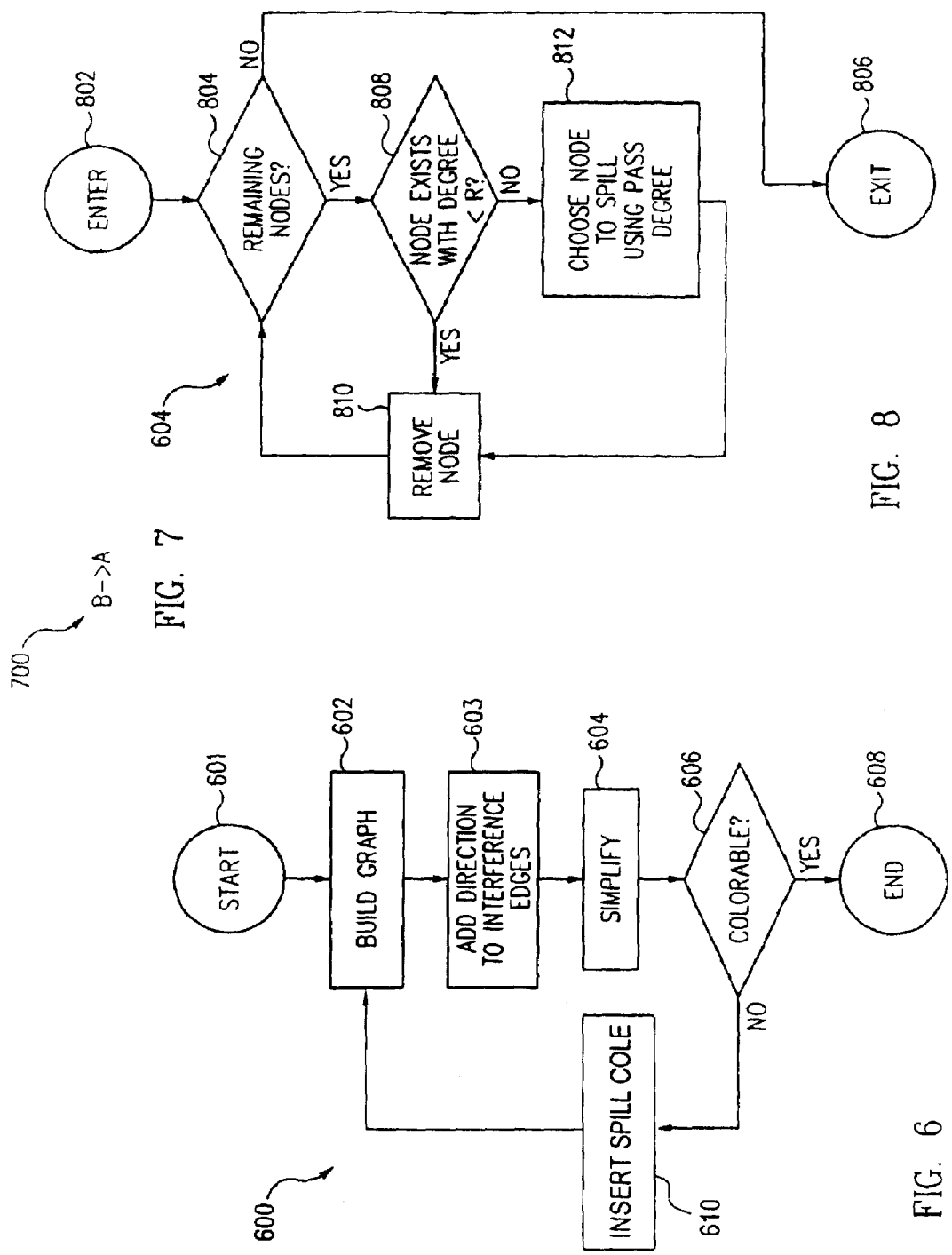

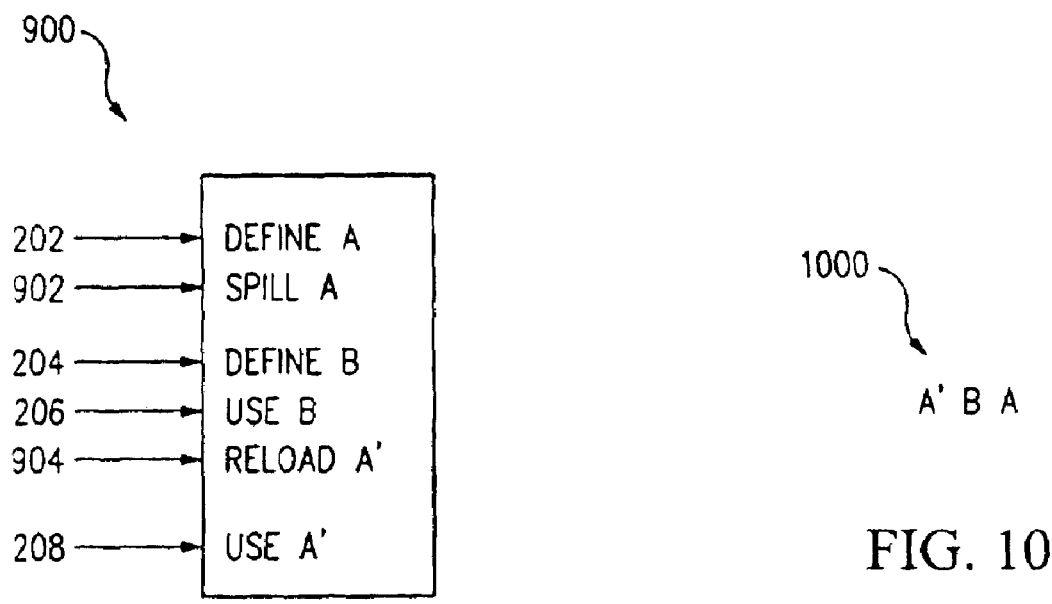
FIG. 9
FIG. 10
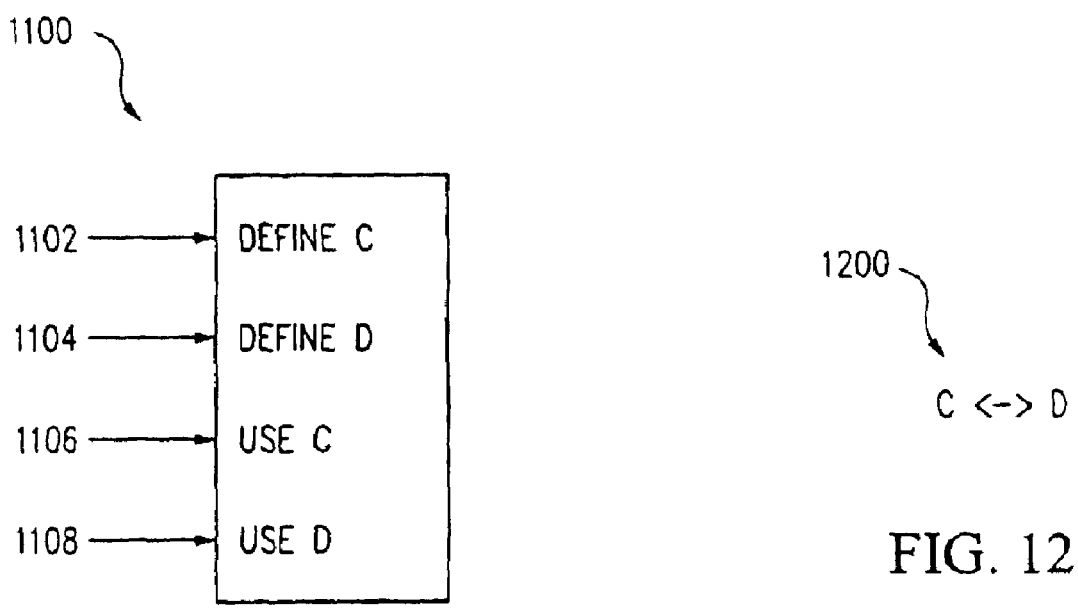
FIG. 11
FIG. 12

US 7,086,045 B2

HEURISTIC TO IMPROVE REGISTER ALLOCATION USING PASS DEGREE

BACKGROUND OF THE INVENTION

1. Field of the Invention

The invention relates to programming language compilers, and more specifically, to a method and apparatus for allocating registers via selective spilling.

2. Description of the Related Art

An important function of an optimizing compiler is allocating physical registers to be used when code instructions generated by the optimizing compiler are executed. Physical registers are actual hardware registers supported by the particular platform on which the code instructions are executed. Ideally, code instructions are executed in the available physical registers without requiring any additional physical registers. However, in many situations, the execution of code instructions requires more than the number of available physical registers.

For example, the execution of a sequence of code instructions may require more intermediate values than the number of available physical registers. In these situations, the physical registers must be allocated to provide for the execution of the code instructions.

One approach for allocating a set of variables to a set of physical registers is known as the graph coloring approach. Generally, the graph coloring approach involves constructing and simplifying a register interference graph for a set of code instructions.

Each variable is represented in the register interference graph as a node. Two nodes are connected when the contents of two variables represented by the nodes cannot simultaneously share a physical register at some point in time during the execution of the code instructions, effectively representing a conflict between the two nodes. Stated another way, two nodes are connected when the contents of two variables represented by the nodes conflict or interfere, i.e., if the variables are ever live simultaneously, or more precisely, if one of the variables is live at a definition point of the other variable.

The register interference graph is then simplified and nodes having fewer connections than the number of available physical registers are removed from the register interference graph. If all of the nodes can be removed from the register interference graph, then a coloring can be determined. That is, all of the variables can be mapped to the available physical registers.

However, sometimes the register interference graph contains one or more nodes having more connections to other nodes than the number of available physical registers. This means that the number of available physical registers is insufficient to store all of the intermediate values specified by the code instructions. Thus, some intermediate values must be stored in other memory.

The process of temporarily storing data from a physical register to another memory location is referred to as "spilling." Generally, spilling involves performing spill operation(s), followed by one or more reload operations. The spill operation causes data contained in a physical register to be stored in another memory location, such as a runtime stack. Each reload operation causes the data to be loaded or copied from the other memory location into a physical register. Reload operations are performed when the data is required for a calculation.

In terms of the register interference graph, a spill is reflected in the register interference graph by disconnecting the spilled node from all other nodes in the register interference graph. Then the register interference graph is rebuilt and simplified again. Any nodes that have been spilled have no connections to other nodes and are removed from the register interference graph when the register interference graph is simplified. This process is repeated until a mapping of the set of variables to the set of physical registers is achieved.

FIG. 1 is a flow chart 100 illustrating a method for mapping a set of variables to a set of physical registers using the graph coloring approach in accordance with the prior art. From a Start Operation 101, a register interference graph is built in a Build Graph Operation 102. Process flow then moves from Build Graph Operation 102 to a Simplify Operation 104.

In Simplify Operation 104, the register interference graph built in Build Graph Operation 102 is simplified and a stack of nodes to drive a Colorable Operation 106 is produced.

In Colorable Operation 106, a determination is made as to whether the register interference graph built in Build Graph Operation 102 can be colored. If the register interference graph can be colored, then the process is completed in an End Operation 108. On the other hand, if in Colorable Operation 106, the register interference graph cannot be colored, then one or more of the variables is spilled in Insert Spill Code Operation 110, which eliminates the spilled variable(s) as a conflicted node in the register interference graph.

In Build Graph Operation 102, the register interference graph is rebuilt. Operations 102, 104, 106, 110 are repeated until the register interference graph is colored, or are aborted if an infinite loop results.

Although the graph coloring approach set forth above allows a set of variables to be mapped to a set of physical registers, the graph coloring approach has some significant disadvantages. One disadvantage is that spill code instructions must be inserted during Insert Spill Code Operation 110 to perform the spill and reload operations. This increases the overall execution time required to process a sequence of code instructions.

In addition, write and read operations to secondary storage media, such as runtime stacks, often take more time to execute than write and read operations to physical registers, such as Central Processing Unit (CPU) registers. As should be readily apparent, higher efficiency is achieved by minimizing the number of variables spilled.

FIG. 2A is a code block 200 containing references to variables A and B in accordance with the prior art. Code block 200 includes code 202, 204 which define variables A and B, respectively. Code block 200 also includes code 206, 208, which use variables B and A, respectively. Code block 200 may also include other code, which is not illustrated. For purposes of this illustration, assume that only one physical register is available.

FIG. 3 is a register interference graph 300 for code block 200 of FIG. 2A in accordance with the prior art. Referring now to FIGS. 1, 2A and 3 together, from Start Operation 101, register interference graph 300 is built in Build Graph Operation 102. As is well known, variable A is live between code 202, when variable A is defined, and code 208, when variable A is used. Since variable B is defined while variable A is live, there is an interference edge between node A and node B, i.e., an interference edge between node A and node B is defined and node A is connected to node B in register interference graph 300.

FIG. 4 is a flow chart of Simplify Operation 104 of flow chart 100 of FIG. 1 in accordance with the prior art.

Referring now to FIGS. 1, 3 and 4 together, from Build Graph Operation 102, Simplify Operation 104 is entered from an Enter Operation 402. From Enter Operation 402, at a Remaining Nodes Operation 404, a determination is made whether there are any remaining nodes in the register interference graph built in Build Graph Operation 102. In this case, it is determined that node A and node B remain in register interference graph 300.

If in Remaining Nodes Operation 404 a determination is made that nodes remain, then in a Node Exist With Degree Less Than The Number of Physical Register Operation 408, hereinafter Operation 408, a determination is made whether a node exists in the register interference graph that has a degree less than the number of physical registers available. The degree of a node is equal to the number of interference edges of the node.

If a determination is made that a node does exist that has a degree less than the number of physical registers available, the node and all of its interference edges are removed from the register interference graph in a Remove Node Operation 410. The removed node is placed in the stack used for Colorable Operation 106.

However, if a determination is made that a node does not exist that has a degree less than the number of physical registers available, then in a Choose Node to Spill Operation 412, a node to be spilled is chosen.

More particularly, in Choose Node to Spill Operation 412, the node with the lowest ratio of spill cost to degree is chosen. This node and all of its interference edges are removed from the register interference graph in Remove Node Operation 410. The removed node is placed in the stack used for Colorable Operation 106.

In this illustration, node A and node B each have a degree of one. Since only a single physical register is available, in Operation 408, a determination is made that a node does not exist that has a degree less than the number of physical registers available.

Since the spill cost and degree of node A is equal to node B, in Choose Node to Spill Operation 412, node A is not distinguishable from node B. Thus, in Choose Node to Spill Operation 412, either node A or node B is chosen randomly.

Assume for purposes of illustration that node B is randomly chosen in Choose Node to Spill Operation 412 and removed in Remove Node Operation 410 and placed in the stack used for Colorable Operation 106. At this point, only node A remains in the register interference graph.

Operations 404, 408, and 410 are then performed to remove node A and place node A in the stack used for Colorable Operation 106. At this point, there are no nodes remaining in the register interference graph.

In Remaining Nodes Operation 404, a determination is made that there are no more remaining nodes. The process then exits at Exit Operation 406 to Colorable Operation 106.

In Colorable Operation 106, an attempt is made to color the register interference graph. More particularly, the register interference graph is rebuilt by inserting each node and its associated interference edges into the register interference graph from the stack built during Simplify Operation 104. Each node and its associated interference edges are inserted in a reverse order from the order the node and its associated interference edges was removed in Simplify Operation 104.

As each node is inserted, the inserted node is colored with the first color that does not appear in any of the nodes connected to the inserted node. These nodes that are connected to the inserted node are sometimes called the inserted node's neighbors. However, if a node is inserted and there is no color available for the inserted node, the inserted node is left uncolored. This process is repeated until all nodes are inserted into the register interference graph.

If all of the nodes are inserted and colored during Colorable Operation 106, the register interference graph is colored and process flow moves to End Operation 108. However, if all of the nodes are inserted and one or more of the nodes are uncolored during Colorable Operation 106, the register interference graph is uncolored and process flow moves to Insert Spill Code Operation 110.

In Insert Spill Code Operation 110, code to spill the variable chosen in Simplify Operation 104 and which is left uncolored in Colorable Operation 106 is generated. After generation of the spill code, the chosen node is sometimes called a spilled node.

From Insert Spill Code Operation 110, in Build Graph Operation 102, the register interference graph is rebuilt. However, this time the register interference graph is rebuilt with the spilled node disconnected from all the other nodes in the register interference graph.

In this illustration, since node B was removed first in Simplify Operation 104 as discussed above, node A is inserted into the register interference graph and colored during Colorable Operation 106. Next, node B is inserted into the register interference graph. However, since there is only a single physical register, i.e., only a single color available, and this color is already taken by node A, there is no color available for node B. Consequently, node B is left uncolored.

Since node B is left uncolored during Colorable Operation 106, the register interference graph is uncolored and process flow moves to Insert Spill Code Operation 110. In Insert Spill Code Operation 110, code to spill variable B is generated.

FIG. 2B is code block 200 of FIG. 2A including additional code for spilling variable B in accordance with the prior art. Referring now to FIGS. 1 and 2B together, during Insert Spill Code Operation 110, code 210 is added immediately following code 204, to perform a spill operation on variable B. As previously discussed, the spill operation writes variable B from a physical register to another memory location, such as a runtime stack.

In addition, code 212 has been added immediately before code 206 to perform a reload operation on variable B, which causes spilled variable B to be reloaded as variable B'. Code 206 then uses the reloaded variable B'.

FIG. 5 is a register interference graph 500 for code block 200 of FIG. 2B in accordance with the prior art. Referring now to FIGS. 1, 2B and 5 together, from Insert Spill Code Operation 110, register interference graph 500 is built in Build Graph Operation 102. Variable A is still live between the code 202 and code 208. Since variables B, B' are defined while variable A is live, there is an interference edge between node A and node B and between node A and node B', i.e., node A is connected to both node B and node B' in register interference graph 500.

As should be readily apparent, register interference graph 500 is not colorable with a single physical register. Thus, in the above illustration, code 210, 212 was needlessly inserted thus reducing efficiency of the compiler.

SUMMARY OF THE INVENTION

In accordance with one embodiment of the present invention, a method includes adding direction to interference edges of a register interference graph and choosing a node of the register interference graph to spill based upon a pass degree of the node.

By using the pass degree, the variable that caused the greatest interference with allocation of the variables to the physical registers is preferentially chosen to be spilled.

In accordance with an alternative embodiment, a method includes building an interference graph by defining an interference edge between a first node and a second node. A determination is made that a first variable associated with the first node is live when a second variable associated with the second node is defined or used. An end of the interference edge adjacent the first node is defined as a pass edge.

In accordance with another embodiment, a system includes a processor and a memory. The memory has a method of allocating a set of variables to a set of physical registers using selective spilling stored therein.

Upon execution of the method, the method includes building an interference graph including defining an interference edge between a first node and a second node. A determination is made that a first variable associated with the first node is live when a second variable associated with the second node is defined or used. An end of the interference edge adjacent the first node is defined as a pass edge.

Also in accordance with one embodiment of the present invention, a computer program product has stored therein a method of allocating a set of variables to a set of physical registers using selective spilling. Upon execution of the method, the method includes adding direction to interference edges of a register interference graph and choosing a node of the register interference graph to spill based upon a pass degree of the node.

In yet another embodiment, a computer system includes means for adding direction to interference edges of a register interference graph and means for choosing a node of the register interference graph to spill based upon a pass degree of the node.

The present invention is best understood by reference to the following detailed description when read in conjunction with the accompanying drawings.

BRIEF DESCRIPTION OF THE DRAWINGS

FIG. 1 is a flow chart illustrating a method for mapping a set of variables to a set of physical registers using the graph coloring approach in accordance with the prior art.

FIG. 2A is a code block containing references to variables A and B in accordance with the prior art.

FIG. 2B is the code block of FIG. 2A including additional code for spilling the variable B in accordance with the prior art.

FIG. 3 is a register interference graph for the code block of FIG. 2A in accordance with the prior art.

FIG. 4 is a flow chart of a Simplify Operation of the flow chart of FIG. 1 in accordance with the prior art.

FIG. 5 is a register interference graph for the code block of FIG. 2B in accordance with the prior art.

FIG. 6 is a flow chart illustrating a method for mapping a set of variables to a set of physical registers in accordance with one embodiment of the present invention.

FIG. 7 is a directional register interference graph formed by adding direction to the interference edges of the register interference graph of FIG. 3 in accordance with one embodiment of the present invention.

FIG. 8 is a flow chart of a Simplify Operation of the flow chart of FIG. 6 in accordance with one embodiment of the present invention.

FIG. 9 is a code block resulting from the addition of spill code for spilling the variable A to the code block of FIG. 2A in accordance with one embodiment of the present invention.

FIG. 10 is a register interference graph for the code block of FIG. 9 in accordance with one embodiment of the present invention.

FIG. 11 is a code block containing references to variables C and D in accordance with another embodiment of the present invention.

FIG. 12 is a directional register interference graph for the code block of FIG. 11 in accordance with one embodiment of the present invention.

Common reference numerals are used throughout the drawings and detailed description to indicate like elements.

DETAILED DESCRIPTION

Figure 13:
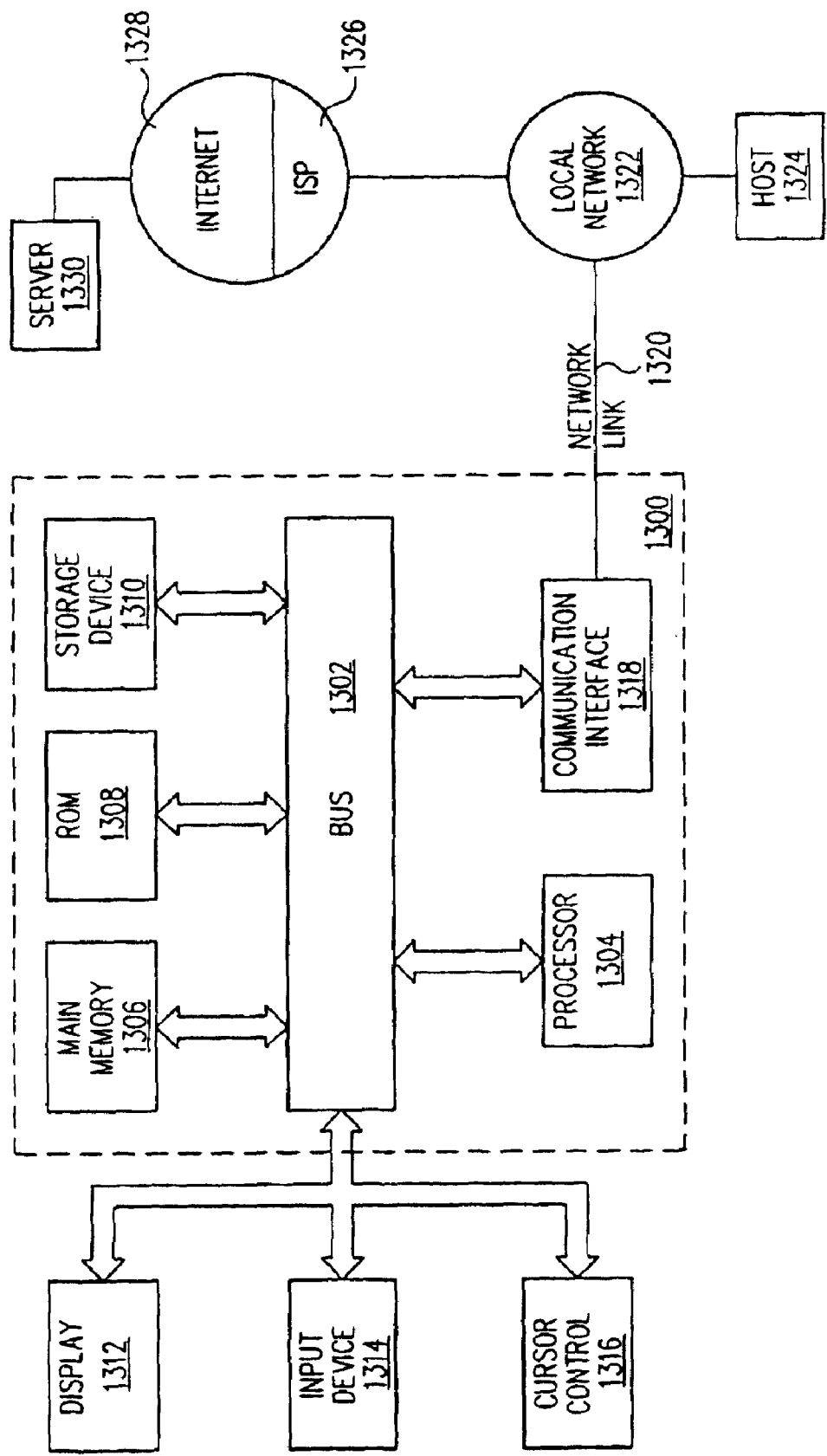
FIG. 13 is a block diagram which illustrates a computer system upon which an embodiment in accordance with the present invention may be implemented.

FIG. 6 is a flow chart 600 illustrating a method for mapping a set of variables to a set of physical registers in accordance with one embodiment of the present invention. From a Start Operation 601, a register interference graph is built in a Build Graph Operation 602. Each interference edge in the register interference graph is represented as a straight line and has a first end and a second end in a conventional manner. Process flow then moves from Build Graph Operation 602 to an Add Direction to Interference Edges Operation 603.

In Add Direction to Interference Edges Operation 603, direction is added to each of the interference edges of the register interference graph built during Build Graph Operation 602. More particularly, for each interference edge, a determination is made as to whether the variable associated with a node was live when the other variable was defined or used. If a variable was live when the other variable was defined or used, the node associated with the variable is a primary node. If a node is not a primary node, then the node is a secondary node. Generally, either one node is the primary node and the other node is the secondary node or both nodes are primary nodes.

In one embodiment, an interference edge exists between a primary node and a secondary node. In accordance with this embodiment, the end of the interference edge adjacent the primary node is defined as a pass edge and the end of the interference edge adjacent the secondary node is defined as a non-pass edge. A pass edge is represented by an arrow that points at the primary node. An interference edge that has a pass edge and a non-pass edge is a uni-directional interference edge.

In another embodiment, an interference edge exists between a primary node and another primary node. In accordance with this embodiment, each end of the interference edge is defined as a pass edge, such that the interference edge has two pass edges. An interference edge that has two pass edges is a bi-directional interference edge.

In Simplify Operation 604, the register interference graph built in Build Graph Operation 602 as modified in Add Direction to Interference Edges Operation 603 is simplified and a stack of nodes to drive a Colorable Operation 606 is produced. As discussed in greater detail below, when choosing a node to spill, the ratio of the spill cost to the pass degree of the node is used. The pass degree of a node is defined as the number of pass edges of the node. By using the pass degree, the variable that caused the greatest interference with allocation of the variables to the physical registers is preferentially chosen to be spilled.

In Colorable Operation 606, a determination is made as to whether the register interference graph built in Build Graph Operation 602 can be colored. If the register interference graph can be colored, then the process is completed in an End Operation 608. On the other hand, if in Colorable Operation 606, the register interference graph cannot be colored, then in Insert Spill Code Operation 610, one or more of the variables is spilled, which eliminates the spilled variable(s) as a conflicted node in the register interference graph.

In Build Graph Operation 602, the register interference graph is rebuilt. Operations 602, 603, 604, 606, 610 are repeated until the register interference graph is colored or are aborted if an infinite loop results.

For purposes of illustration, assume again that code block 200 of FIG. 2A has only one physical register available. Referring now to FIGS. 2A, 3 and 6 together, from Start Operation 601, register interference graph 300 (FIG. 3) for code block 200 of FIG. 2A is built in Build Graph Operation 602. Build Graph Operation 602 is substantially similar to Build Graph Operation 102 of FIG. 1 and so is not discussed further to avoid detracting from the principals of the invention.

From Build Graph Operation 602, direction is added to the interference edges of register interference graph 300 in Add Direction to Interference Edges Operation 603. FIG. 7 is a directional register interference graph 700 formed by adding direction to the interference edges of register interference graph 300 of FIG. 3 in accordance with one embodiment of the present invention.

More particularly, referring now to FIGS. 2A, 3 and 7 together, variable A, e.g., a first variable, is live between the code 202 and code 208. Variable B, e.g., a second variable, is defined at code 204 between code 202 and code 208, i.e., while variable A is live. Since variable A was live when variable B was defined, node A, e.g., a first node associated with variable A, is a primary node.

Conversely, variable B is live between code 204 and code 206. Variable A is defined at code 202 before variable B is live and is used at code 208 after variable B is dead. Thus, variable A is not defined or used while variable B is live and node B, e.g., a second node associated with variable B, is not a primary node. Since node B is not a primary node, node B is a secondary node.

In accordance with this embodiment, the end of the interference edge adjacent node A is defined as a pass edge as indicated by the arrow pointing at node A and the end of the interference edge adjacent node B is defined as a non-pass edge. This interference edge is an example of a uni-directional interference edge.

FIG. 8 is a flow chart of Simplify Operation 604 of flow chart 600 of FIG. 6 in accordance with one embodiment of the present invention. Referring now to FIGS. 6, 7 and 8 together, from Add Direction to Interference Edges Operation 603, Simplify Operation 604 is entered from an Enter Operation 802. From Enter Operation 802, at a Remaining Nodes Operation 804, a determination is made whether there are any remaining nodes in the register interference graph. In this case, it is determined that node A and node B remain in directional register interference graph 700.

If in Remaining Nodes Operation 804 a determination is made that nodes remain, then in a Node Exists With Degree Less Than The Number Of Physical Registers Available Operation 808, hereinafter Operation 808, a determination is made whether a node exists in the register interference graph that has a degree less than the number of physical registers available. Recall that the degree of a node is equal to the number of interference edges of the node.

If a determination is made that a node does exist that has a degree less than the number of physical registers available, the node and all of its interference edges are removed from the register interference graph in a Remove Node Operation 810. The removed node is placed in the stack used for Colorable Operation 606.

However, if a determination is made that a node does not exist that has a degree less than the number of physical registers available, then in a Choose Node To Spill Using Pass Degree Operation 812, a node to be spilled is chosen.

More particularly, in Choose Node To Spill Using Pass Degree Operation 812, the node with the lowest ratio of spill cost to pass degree is chosen. This node and all of its interference edges are removed from the register interference graph in Remove Node Operation 810. The removed node is placed in the stack used for Colorable Operation 606.

In one embodiment, the spill cost is:

(for each use, sum of (BF*Cuse)+for each def, sum of (BF*Cdef)), where BF is the block frequency. However, spill cost can be defined using other techniques and the particular technique to define spill cost is not essential to the present invention.

Recall that the pass degree of a node is defined as the number of pass edges of the node. In one embodiment, when the pass degree is zero, the ratio of spill cost to pass degree is defined as infinity. However, in an alternative embodiment, a small constant is added to the pass degree to avoid division by zero. In accordance with this embodiment, in Choose Node To Spill Using Pass Degree Operation 812, the node with the lowest ratio of spill cost to pass degree plus constant is chosen to be spilled. Generally, the constant is negligible except when the pass degree is zero and so is not discussed further to avoid detracting from the principals of the invention.

In this illustration, node A and node B each have a degree of one. Since only a single physical register is available, in Operation 808, a determination is made that a node does not exist that has a degree less than the number of physical registers available. From Operation 808, the process moves to Choose Node To Spill Using Pass Degree Operation 812.

The spill cost of node A and node B is equal. In this illustration, node A has a pass degree of one and node B has a pass degree of zero.

Since node A has the lowest ratio of spill cost to pass degree, node A is chosen to be spilled. Thus, node A is removed in Remove Node Operation 810 and placed in the stack used for colorable operation 606. At this point, only node B remains in the register interference graph.

Operations 804, 808, and 810 are then performed to remove node B and place node B in the stack used for Colorable Operation 606. At this point, there are no nodes remaining in the register interference graph.

In Remaining Nodes Operation 804, a determination is made that there are no more remaining nodes. The process then exits at Exit Operation 806 to Colorable Operation 606.

In Colorable Operation 606, an attempt is made to color the register interference graph. More particularly, the register interference graph is rebuilt by inserting each node and its associated edges into the register interference graph from the stack built during Simplify Operation 604. Each node and its associated edges are inserted in a reverse order from the order the node and its associated edges was removed in Simplify Operation 604.

As each node is inserted, the inserted node is colored with the first color that does not appear in any of the inserted node's neighbors. However, if a node is inserted and there is no color available for the inserted node, the inserted node is left uncolored. This process is repeated until all nodes are inserted into the register interference graph.

If all of the nodes are inserted and colored during Colorable Operation 606, the register interference graph is colored and process flow moves to End Operation 608. However, if all of the nodes are inserted and one or more of the nodes are uncolored during Colorable Operation 606, the register interference graph is uncolored and process flow moves to Insert Spill Code Operation 610.

In Insert Spill Code Operation 610, code to spill the variable(s) associated with the node(s) chosen in Simplify Operation 604 and which is left uncolored in Colorable Operation 606 is generated. After generation of the spill code, the chosen node is sometimes called a spilled node.

From Insert Spill Code Operation 610, in Build Graph Operation 602, the register interference graph is rebuilt. However, this time the register interference graph is rebuilt with the spilled node disconnected from all the other nodes in the register interference graph.

In this illustration, since node A was removed first in Simplify Operation 604 as discussed above, node B is inserted into the register interference graph and colored during Colorable Operation 606. Next, node A is inserted into the register interference graph. However, since there is only a single physical register, i.e., only a single color available, and this color is already taken by node B, there is no color available for node A. Consequently, node A is left uncolored.

Since node A is left uncolored during Colorable Operation 606, the register interference graph is uncolored and process flow moves to Insert Spill Code Operation 610. In Insert Spill Code Operation 610, code to spill variable A is generated.

FIG. 9 is code block 900 resulting from the addition of spill code for spilling variable A to code block 200 of FIG. 2A in accordance with one embodiment of the present invention. Referring now to FIGS. 6 and 9 together, during Insert Spill Code Operation 610, code 902 is added immediately following code 202, to perform a spill operation on variable A. The spill operation writes variable A from a physical register to another memory location, such as a runtime stack.

In addition, code 904 has been added immediately before code 208 to perform a reload operation on variable A, which causes spilled variable A to be reloaded as variable A'. Code 208 then uses the reloaded variable A'.

FIG. 10 is a register interference graph 1000 for code block 900 of FIG. 9 in accordance with one embodiment of the present invention. Referring now to FIGS. 6, 9 and 10 together, from Insert Spill Code Operation 610, register interference graph 1000 is built in Build Graph Operation 602. Variable A is live between code 202 and code 902. Variable B is live between code 204 and code 206. Variable A' is live between code 904 and code 208. Since none of variables A, B or A' are defined or used while any of the other variables A, B or A' are live, there are no interference edges between nodes A, B or A'.

Since there are no interference edges, the process moves from Build Graph Operation 602 through Add Direction to Interference Edges Operation 603 to Simplify Operation 604. Referring now to FIGS. 6 and 8 together, Operations 804, 808, and 810 are repeated until nodes A, B and A' are removed and placed in the stack used for Colorable Operation 606. In Colorable Operation 606, nodes A, B and A' are all colored. Since nodes A, B and A' are all colored, the register interference graph is colored and the process is completed in End Operation 608.

By using the pass degree to choose which node to spill, variable A was preferentially chosen to be spilled. In this manner, the efficiency of the compiler is maximized.

As set forth above, the interference edge between node A and node B of directional register interference graph 700 of FIG. 7 is an example of a uni-directional interference edge in accordance with one embodiment of the present invention. In another embodiment, an interference edge exists between a primary node and another primary node. In accordance with this embodiment, each end of the interference edge is defined as a pass edge, such that the interference edge has two pass edges. An interference edge that has two pass edges is a bi-directional interference edge as discussed further below in reference to FIGS. 11 and 12.

FIG. 11 is a code block 1100 containing references to variables C and D in accordance with another embodiment of the present invention. Code block 1100 includes code 1102, 1104 which define variables C and D, respectively. Code block 1100 also includes code 1106, 1108, which use variables C and D, respectively. Code block 1100 may also include other code, which is not illustrated.

For purposes of this illustration, assume that only one physical register is available. FIG. 12 is a directional register interference graph 1200 for code block 1100 of FIG. 11 in accordance with one embodiment of the present invention.

Referring now to FIGS. 11 and 12 together, variable C is live between the code 1102, when variable C is defined, and code 1106, when variable C is used. Since variable D is defined while variable C is live, i.e., between code 1102 and code 1106, there is an interference edge between node C and node D, i.e., node C is connected to node D in directional register interference graph 1200. Further, since variable D is defined while variable C is live, node C is a primary node. Accordingly, the end of the interference edge adjacent node C is a pass edge as indicated by the arrow pointing at node C.

Similarly, variable D is live between the code 1104, when variable D is defined, and code 1108, when variable D is used. Since variable C is used while variable D is live, i.e., between code 1104 and code 1108, node D is a primary node. Accordingly, the end of the interference edge adjacent node D is a pass edge as indicated by the arrow pointing at node D. Overall, the interference edge between node C and node D of directional register interference graph 1200 of FIG. 12 is an example of a bi-directional interference edge in accordance with one embodiment of present invention.

For simplicity of discussion, directional register interference graph 700 of FIG. 7 and directional register interference graph 1200 of FIG. 12 each have two nodes. However, in application, a register interference graph in accordance with the present invention typically has many more nodes than two. In light of this disclosure, those of skill in the art will understand that the principals discussed above in accordance with the present invention are equally applicable to a register interference graph having any number of nodes.

FIG. 13 is a block diagram which illustrates a computer system 1300 upon which an embodiment in accordance with the present invention may be implemented. Computer system 1300 includes a bus 1302 or other communication mechanism for communicating information, and a processor 1304 coupled with bus 1302 for processing information.

Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions by processor 1304.

Computer system 1300 also includes a read only memory (ROM) 1308 or other static storage device coupled to bus 1302 for storing static information and instructions for processor 1304. A storage device 1310, such as a magnetic disk or optical disk, is also provide and coupled to bus 1302 for storing information and instructions.

Computer system 1300 may also be coupled via bus 1302 to a display 1312, such as a cathode ray tube (CRT), for displaying information to a computer user. An input device 1314, including alphanumeric and other keys, is also provided and coupled to bus 1302 for communicating information and command selections to processor 1304.

Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), which allows the device to specify positions in a plane.

Computer system 1300 is used to allocate a set of variables to a set of physical registers using selective spilling in accordance with various embodiments of the present invention. According to one embodiment, the allocation of a set of variables to a set of physical registers using selective spilling is provided by computer system 1300 in response to processor 1304 executing sequences of instructions contained in main memory 1306.

Such instructions may be read into main memory 1306 from another computer-readable medium, such as storage device 1310. However, the computer-readable medium is not limited to devices such as storage device 1310. For example, the computer-readable medium may include a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer is capable of reading. Execution of the sequences of instructions contained in main memory 1306 causes processor 1304 to perform the operations previously described. In alternative embodiments, hardwired circuitry may be used in place of or in combination with software instructions. Thus, embodiments in accordance with the present invention are not limited to any specific combination of hardware circuitry and software.

Computer 1300 also includes a communication interface 1318 coupled to bus 1302. Communication interface 1318 provides a two-way data communication coupling to a network link 1320 to a local network 1322.

For example, if communication interface 1318 is an integrated services digital network (ISDN) card or a modem, communication interface 1318 provides a data communication connection to the corresponding type of telephone line. If communication interface 1318 is a local area network (LAN) card, communication interface 1318 provides a data communication connection to a compatible LAN. Wireless links are also possible. In any such implementation, communication interface 1318 sends and receives electrical, electromagnetic or optical signals which carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326.

ISP 1326 in turn provides data communication services through the world wide packet data communication network now commonly referred to as the "Internet" 1328. Local network 1322 and Internet 1328 both use electrical, electromagnetic or optical signals which carry digital data streams. The signals through the various networks and the signals on network link 1320 and through communication interface 1318, which carry the digital data to and from computer 1300 are exemplary forms of carrier waves transporting the information.

Computer 1300 is capable of sending messages and receiving data, including program code, through the network(s), network link 1320 and communication interface 1318. In the Internet example, a server 1330 might transmit a requested code for an application program through Internet 1328, ISP 1326, local network 1322 and communication interface 1318. In accordance with one embodiment of the present invention, one such downloaded application provides for the allocation of a set of variables to a set of physical registers using selective spilling as described herein.

The received code may be executed by processor 1304 as it is received, and/or stored in storage device 1310, or other non-volatile storage for later execution. In this manner, computer 1300 may obtain application code in the form of a carrier wave.

The embodiments described herein may be employed as part of a computer language compiler or as a stand alone process for allocating registers using selective spilling.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A method comprising:
    adding direction to interference edges of a register interference graph, wherein each interference edge extends between two nodes of said register interference graph, said adding direction comprising:
        for each node of each interference edge, determining whether a variable associated with said node was live when an other variable associated with the other node of said two nodes was defined or used;
        wherein upon a determination that said variable associated with said node was live when said other variable associated with said other node was defined or used, said first node is a primary node; and
        defining an interference edge adjacent a primary node as a pass edge;
    defining a pass degree of each node as the number of pass edges of said node; and
    choosing a node of said register interference graph to spill based upon said pass degree of said node.

2. The method of claim 1 further comprising building said register interference graph.

3. The method of claim 1 wherein said register interference graph comprises:
    a first node;
    a second node; and an interference edge between said first node and said second node, said first node being a primary node.

4. The method of claim 3 wherein said second node is a secondary node.

5. The method of claim 4 wherein said interference edge consists of a uni-directional interference edge.

6. The method of claim 4 wherein an end of said interference edge adjacent said first node comprises a pass edge and wherein an end of said interference edge adjacent said second node comprises a non-pass edge.

7. The method of claim 3 wherein said second node is a primary node.

8. The method of claim 7 wherein said interference edge consists of a bi-directional interference edge.

9. The method of claim 7 wherein an end of said interference edge adjacent said first node comprises a pass edge and wherein an end of said interference edge adjacent said second node comprises a pass edge.

10. The method of claim 3 wherein a first variable associated with said first node is live when a second variable associated with said second node is defined or used.

11. A method comprising:
    building a register interference graph comprising defining an interference edge between a first node and a second node;
    wherein upon a determination that a first variable associated with said first node is live when a second variable associate with said second node is defined or used, said first node is a primary node;
    defining an end of said interference edge adjacent said first node as a pass edge;
    defining a pass degree of said first node as a number of pass edges of said first node; and
    using said pass degree when choosing to spill a node from said register interference graph.

12. A system comprising:
    a processor; and
    a memory having a method of allocating a set of variables to a set of physical registers using selective spilling stored therein, wherein upon execution of said method, said method comprises:
    building a register interference graph comprising defining an interference edge between a first node and a second node;
    wherein upon a determination that a first variable associated with said first node is live when a second variable associate with said second node is defined or used, said first node is a primary node;
    defining an end of said interference edge adjacent said first node as a pass edge;
    defining a pass degree of said first node as a number of pass edges of said first node; and
    using said pass degree when choosing to spill a node from said register interference graph.

13. A computer program product having a method of allocating a set of variables to a set of physical registers using selective spilling stored therein, wherein upon execution of said method, said method comprises:
    adding direction to interference edges of a register interference graph, wherein each interference edge extends between two nodes of said register interference graph, said adding direction comprising:
    for each node of each interference edge, determining whether a variable associated with said node was live when an other variable associated with the other node of said two nodes was defined or used;
    wherein upon a determination that said variable associated with said node was live when said other variable associated with said other node was defined or used, said first node is a primary node; and
    defining an interference edge adjacent a primary node as a pass edge;
    defining a pass degree of each node as the number of pass edges of said node; and
    choosing a node of said register interference graph to spill based upon said pass degree of said node.

14. The computer program product of claim 13 wherein said method further comprises building said register interference graph.

15. The computer program product of claim 13 wherein said register interference graph comprises:
    a first node;
    a second node; and
    an interference edge between said first node and said second node, said first node being a primary node.

16. The computer program product of claim 15 wherein said second node is a secondary node.

17. The computer program product of claim 16 wherein said interference edge consists of a uni-directional interference edge.

18. The computer program product of claim 16 wherein an end of said interference edge adjacent said first node comprises a pass edge and wherein an end of said interference edge adjacent said second node comprises a non-pass edge.

19. The computer program product of claim 15 wherein said second node is a primary node.

20. The computer program product of claim 19 wherein said interference edge consists of a bi-directional interference edge.

21. The computer program product of claim 19 wherein an end of said interference edge adjacent said first node comprises a pass edge and wherein an end of said interference edge adjacent said second node comprises a pass edge.

22. The computer program product of claim 15 wherein a first variable associated with said first node is live when a second variable associated with said second node is defined or used.

23. A computer system comprising:
    means for adding direction to interference edges of a register interference graph, wherein each interference edge extends between two nodes of said register interference graph, said means for adding direction comprising:
    for each node of each interference edge, a means for determining whether a variable associated with said node was live when an other variable associated with the other node of said two nodes was defined or used;
    wherein upon a determination that said variable associated with said node was live when said other variable associated with said other node was defined or used, said first node is a primary node; and
    a means for defining an interference edge adjacent a primary node as a pass edge;
    a means for defining a pass degree of each node as the number of pass edges of said node; and
    means for choosing a node of said register interference graph to spill based upon said pass degree of said node.

24. The computer system of claim 23 further comprising means for building said register interference graph.

25. The computer system of claim 23 further comprising means for spilling said node.

* * * * *